United States Patent [19]

Reames, Jr.

[11] Patent Number: 4,715,345

[45] Date of Patent: Dec. 29, 1987

[54] AUTOMATIC FUEL SHUT OFF SYSTEM FOR FUEL-INJECTED ENGINES

[76] Inventor: Carter Reames, Jr., 1845-B Starboard, Baton Rouge, La. 70820

[21] Appl. No.: 756,254

[22] Filed: Jul. 18, 1985

[51] Int. Cl.[4] ....................... F02M 39/00; F16K 31/18

[52] U.S. Cl. .................................... 123/512; 123/514; 123/198 D; 137/433; 137/399

[58] Field of Search ............... 123/512, 514, 516, 510, 123/511, 518, 198 D, 198 DB; 137/599.1, 455, 399, 571

[56] References Cited

U.S. PATENT DOCUMENTS

| | | | |
|---|---|---|---|
| 1,159,096 | 6/1916 | Grunwald | 123/514 |
| 1,269,987 | 6/1918 | Church | 123/510 |
| 1,437,279 | 11/1922 | Twombly | 123/510 |
| 1,639,784 | 8/1927 | Porsche | 123/512 |
| 2,284,166 | 5/1942 | Pye | 123/510 |
| 2,767,551 | 10/1956 | Clute | 137/433 |
| 2,793,698 | 5/1957 | Brown | 137/433 |
| 2,998,056 | 8/1961 | Capehart | 137/433 |
| 3,118,492 | 1/1964 | Stone | 123/514 |
| 3,465,784 | 9/1969 | Cofoid | 137/399 |
| 3,610,220 | 10/1971 | Yamada | 123/518 |

FOREIGN PATENT DOCUMENTS

| | | | |
|---|---|---|---|
| 1192011 | 4/1965 | Fed. Rep. of Germany | 137/399 |

*Primary Examiner*—Carl Stuart Miller
*Attorney, Agent, or Firm*—John F. Sieberth

[57] ABSTRACT

Described is an assembly that is interposed between the main fuel supply and the fuel injection system of a fuel-injected gasoline engine or diesel engine. When the main supply of fuel becomes exhausted, the assembly (i) automatically shuts off the flow of fuel to the fuel injection system, (ii) causes the engine to cease operating through fuel starvation, and (iii) prevents air from entering the fuel injection system. The assembly forms and utilizes a reserve supply of fuel and utilizes the vacuum created by the fuel-starved engine in such a way as to insure that no air becomes entrained in the fuel injection system when operation of the engine is resumed with a replenished fuel supply.

15 Claims, 8 Drawing Figures

AUTOMATIC FUEL SHUT OFF SYSTEM FOR FUEL-INJECTED ENGINES

TECHNICAL FIELD

This invention relates to a valve system that automatically shuts off the fuel supply to a fuel-injected internal combustion engine before the fuel injection system runs out of fuel.

BACKGROUND

When a fuel-injected gasoline engine or a diesel engine runs out of fuel, the depletion of the fuel contained in the fuel injection pump gives rise to a number of problems. Particularly in the case of diesel engines the pump is lubricated by the fuel oil and when it is gone, the pump begins to wear. Further, the injection pump in either type of fuel-injected engine looses its prime so that nothing can be pumped until priming has been restored In most circumstances the only way to restore fuel to the pump is to loosen ("crack") the injectors and pump fuel by means of a manual pump or the like until it fills and runs from the loosened injectors. And filling the fuel filters is another troublesome and time-consuming operation. Oftentimes the purging of the air from the fuel injection system requires the services of a qualified mechanic, and the expenses involved are not inconsequential.

This invention is deemed to overcome the foregoing difficulties in a most efficient, expeditious, and economical manner.

THE INVENTION

In its most basic form this invention provides means for and methods of automatically shutting off the fuel supply to an operating fuel-injected internal combustion engine when its main fuel supply has become exhausted so that it ceases to operate through fuel starvation before air can enter the fuel injection system of the engine.

In accordance with a preferred embodiment of this invention a novel float valve assembly is provided that has the ability to automatically shut off the fuel supply to the fuel injection system before any air can enter that system. In addition, the assembly forms and utilizes a reserve supply of fuel and utilizes the vacuum created by the fuel-starved engine in such a way as to insure that no air becomes entrained in the fuel injection system when operation of the engine is resumed with a replenished fuel supply.

In one such embodiment this invention provides an automatic fuel shut off valve system for fuel-injected internal combustion engines which comprises (a) an air-tight reservoir having a fuel inlet disposed at its upper portion, and a fuel outlet disposed below the inlet and connectable to a fuel line leading to a fuel injection system; said reservoir, fuel inlet, and fuel outlet being adapted to maintain a balanced flow of fuel through the reservoir and to maintain a substantially constant volume of liquid fuel within the reservoir so long as fuel continues to enter the fuel inlet; (b) float valve means for sealing off the flow of fuel from the reservoir when the volume of the fuel therein falls to a predetermined smaller quantity; (c) bleed valve means to provide, on actuation, open communication between the exterior of the reservoir and the interior of the upper portion of the reservoir; and (d) pressure equalization means to enable, on actuation, equalization of pressure on both sides of the situs of the seal created by the float valve means, without intake of air into the fuel injection system.

Of the various types of fuel equalization means that may be employed in this system, two types of assemblies are preferred. One of these involves use of a fuel bypass line disposed and adapted to transmit fuel remaining upstream from the seal effected by the float valve means to a point downstream from (beyond) the seal effected by the float valve means. This bypass line is fitted with a valve such as a stopcock that is normally in the closed position. Pressure equalization occurs when the valve is actuated (i.e., opened, usually manually). In the other preferred assembly the pressure equalization means comprises means for physically displacing the float valve means after it has sealed off the fuel outlet means to thereby enable the equalization of pressure to occur directly through the situs of the former seal.

Of the various types of float valve means that may be used in the systems of this invention, several types, all of which employ a ball valve and a seat therefor, are preferred. In one such float valve means consists essentially of a single ball having a specific gravity less than but in proximity to the specific gravity of the fuel so that the ball remains afloat in the fuel except when brought into proximity to the valve seat by fuel being drawn through the fuel outlet as the volume of the fuel within the reservoir approaches said predetermined smaller quantity, and in which case the ball is drawn into and cooperates with the valve seat to effect the sealing off of the flow of fuel from the reservoir. It is desirable when employing only a single ball valve in this manner to include in the reservoir suitable means such as a vertical conduit or the like to guide the ball into proximity to the valve seat as the volume of the fuel within the reservoir approaches its predetermined smaller quantity. As will be seen hereinafter, such a vertical conduit will possess suitably positioned fuel inlet vents or apertures to permit the fuel to flow into the conduit on its way to the fuel outlet, and in so doing to assist in forcing the ball valve into fuel-tight sealing engagement with its valve seat.

Another type of float valve means is characterized in that the reservoir contains a vertical conduit coaxially aligned with the fuel outlet, the conduit having the aforesaid fuel inlet vents providing communication to the fuel outlet, and in that the float valve means is disposed within this conduit and comprises (i) a float member, (ii) a ball valve disposed below the float member and adapted to effect a fuel-tight seal with a valve seat, and (iii) a connector extending between the float member and the ball valve to enable them to move vertically in unison within the conduit in response to a change in the level of the fuel within the reservoir.

Still another preferred float valve means likewise involves use of a vertical conduit having the fuel inlet vents, but in this case the conduit contains at least two free floating unconnected spherical members one superposed upon another, the bottom spherical member constituting a ball valve adapted to effect a fuel-tight seal with a valve seat. Each such spherical member should have a specific gravity less than but in proximity to the specific gravity of the fuel so that they remain afloat in superposed position in the fuel within the conduit except when the spherical members are brought into proximity with the fuel inlet vents by fuel being drawn through the fuel outlet as the volume of the fuel within the reservoir approaches its predetermined smaller quantity. When this occurs, one or more of the spherical members are forced downwardly by the flow of fuel through the fuel inlet vents so that the bottom spherical member is drawn into and cooperates with the valve seat to effect the sealing off of the flow of fuel from the reservoir.

Ball valves fabricated from polypropylene have been found particularly desirable especially for use with diesel fuel because of its inertness to the fuel and its slightly lower specific gravity than the commonly used grades of diesel fuel. Other materials are suitable and may be used in lieu of polypropylene.

It will be appreciated that either of the preferred pressure equalization systems referred to above may be utilized in conjunction with each of the several preferred float valve means described above.

The automatic fuel shut off valve systems of this invention are well-suited for use with fuel-injected gasoline engines, and with diesel engines which of course involve use of fuel injection.

Pursuant to another embodiment of this invention there is provided in the operation of a fuel-injected internal combustion engine equipped with a fuel injection system and having a main fuel supply, the improvement which comprises: (a) passing an air-free flow of fuel from the main fuel supply through an air-tight reservoir and thence through a fuel line to the injection system; (b) when the main fuel supply reaches the condition at which it no longer flows to the reservoir, automatically sealing off the flow of fuel from the reservoir to the fuel injection system so that:

(i) a vacuum condition is created in the line between the reservoir and the fuel injection system, and the engine ceases to operate through fuel starvation; and (ii) a reserve supply of fuel is held within the reservoir thereby preventing entry of air into the fuel injection system;

(c) replenishing the main and reserve fuel supplies; (d) equalizing the pressure between the reservoir and said line to relieve the vacuum condition existing in the line while preventing entry of air into the injection system and (e) restarting the engine thereby reestablishing an air-free flow of fuel from the replenished main fuel supply through the air-tight reservoir and thence through the fuel line to the injection system.

The above and other features and embodiments of this invention will become still further apparent from the ensuing description, appended claims, and accompanying Drawings in which like parts are represented by like numerals and in which:

Figure 1:
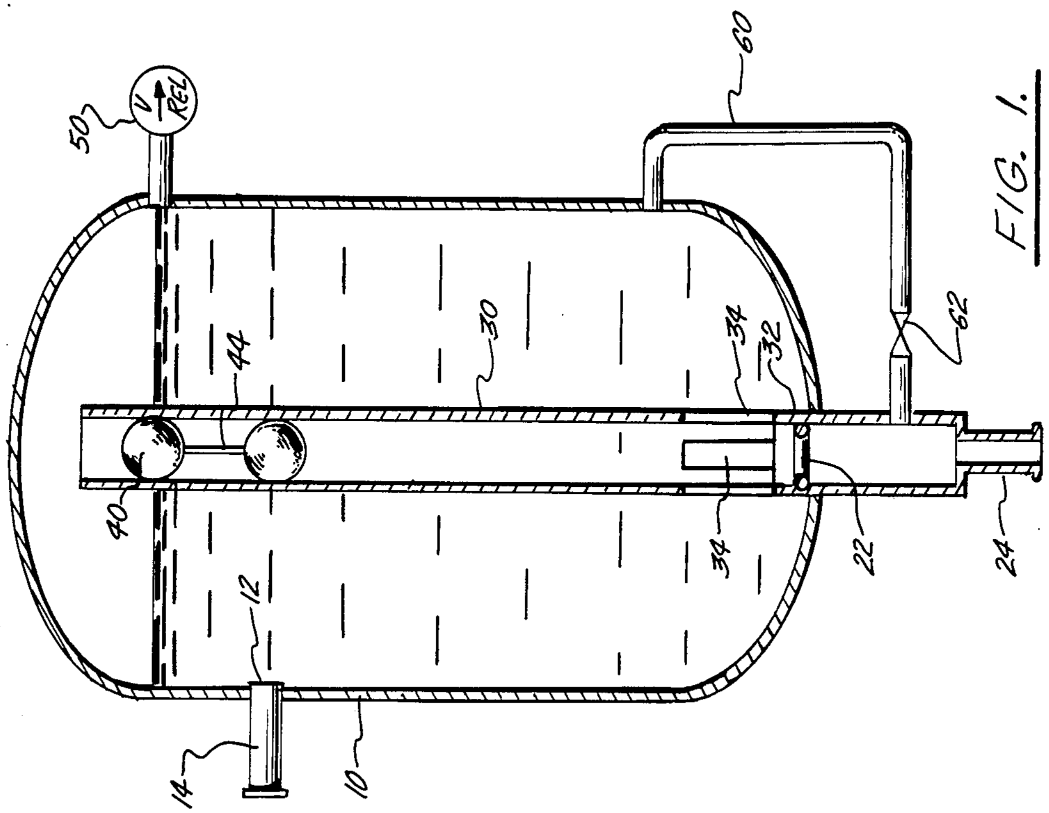
FIG. 1 is a side view in section and partly schematic, of an automatic fuel shut off valve system of the invention having a three-piece unitary ball valve assembly and a valved bypass line for pressure equalization, the system being depicted in its normal open position.
Figure 3A:
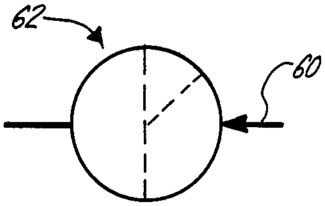
Figure 3B:
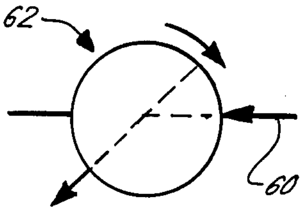
Figure 3C:
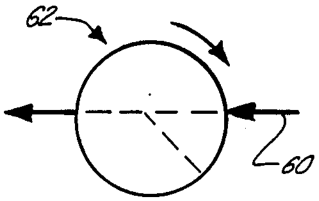
Figure 4:
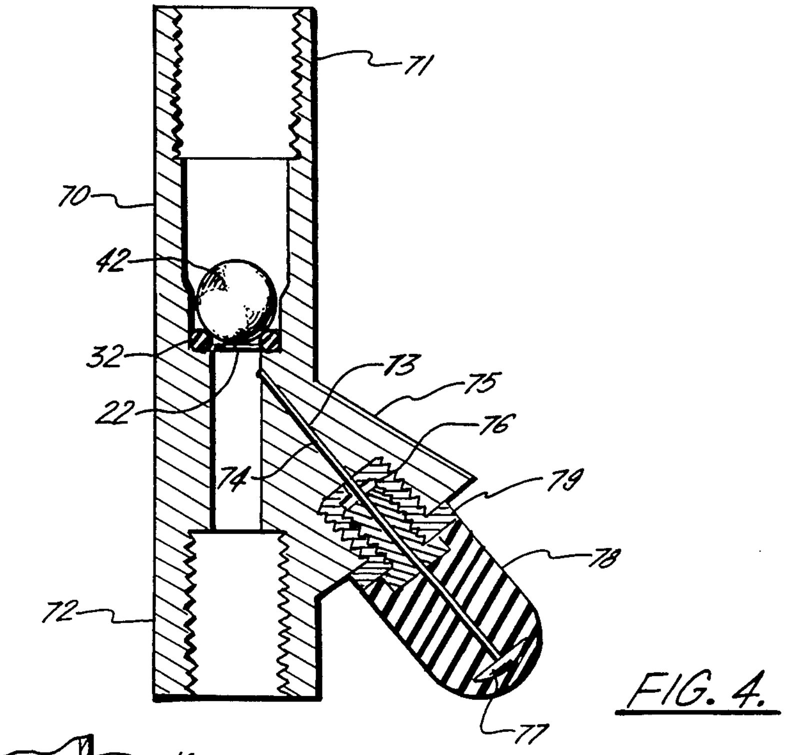
Figure 6:
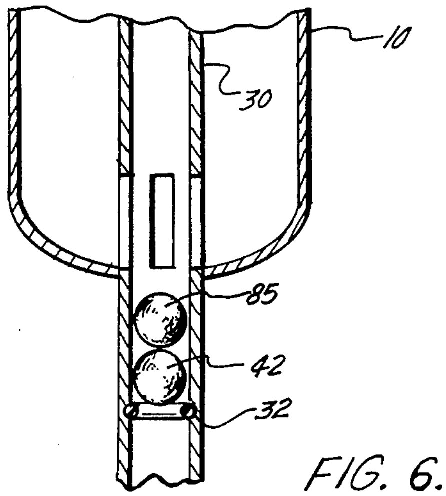
Figure 5:
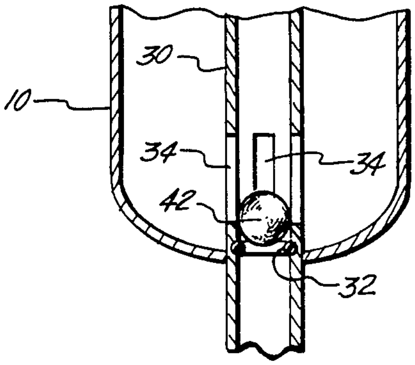

FIGS. 3A, 3B, and 3C are schematic depictions of a three-way stopcock valve that may be used for effecting pressure equalization in the system of FIG. 1, the valve being shown in its normal closed position in FIG. 3A, in its priming position in FIG. 3B, and in its pressure equalization position in FIG. 3C;

FIG. 4 is a side view in section of a preferred valve seat assembly of this invention that may be substituted for the valved bypass line in the system of FIG. 1 and used for effecting the pressure equalization;

FIG. 5 is a fragmentary vertical section of a portion of the reservoir and a ball valve assembly involving use of only a single ball; and FIG. 6 is a fragmentary vertical section of a portion of the reservoir and a ball valve assembly involving use of two free floating spherical members in superposed position, the bottom sphere constituting the ball valve.

Figure 2:
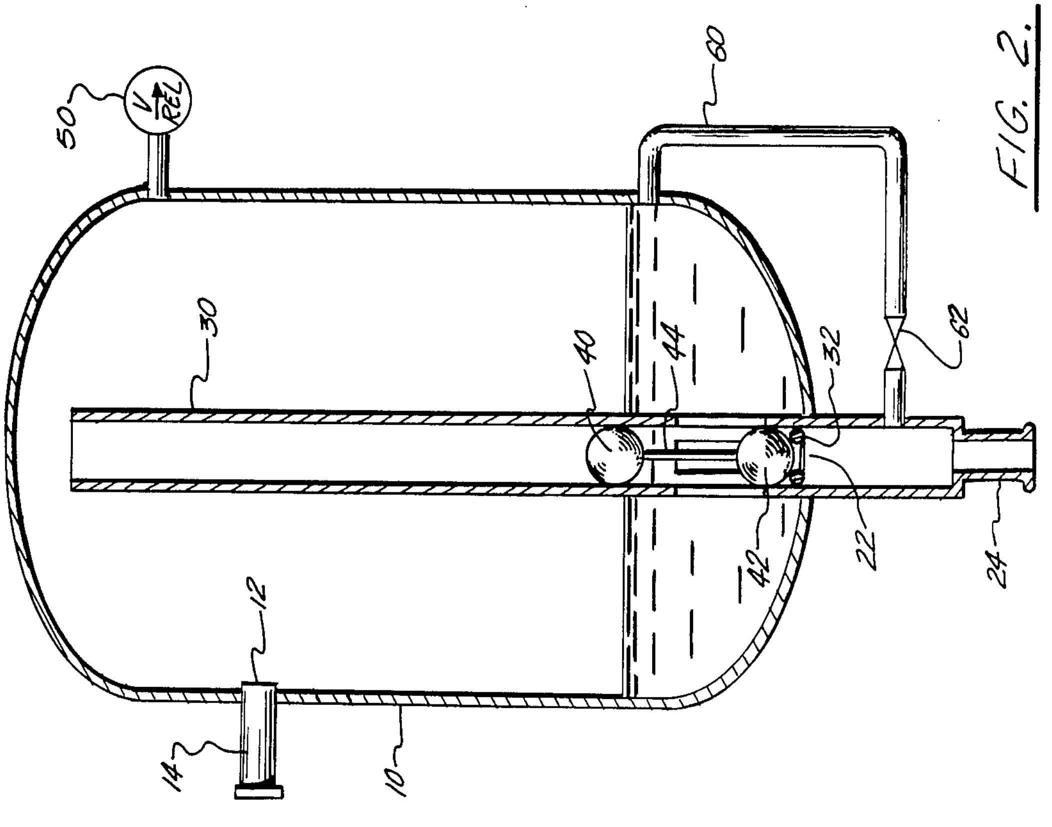
FIG. 2 is the same view of the system shown in FIG. 1 but depicting the system in its sealed-off position.

In the form depicted in FIGS. 1 and 2, reservoir 10 is equipped with inlet port 12 in its upper wall portion associated with exterior nozzle or spout 14 and outlet port 22 associated with exterior nozzle or spout 24. Spout 24 is connectable to a line (not shown) for receiving fuel coming from the fuel supply. Spout 24 is connectable to a line (not shown) for delivering fuel to the fuel injection system of the engine. Conduit 30 is coaxially aligned with outlet port 22 and reservoir 10 and extends upwardly in reservoir 10 from ball valve seat 32 to almost the top of the reservoir. Conduit 30 has at its lower portion within reservoir 10 a plurality of vents 34 in proximity to valve seat 32 and port 22. In the form of apparatus depicted, the lower portion of conduit 30 extends from the bottom of reservoir 10 and thus in part constitutes an extension of reservoir 10. A float valve composed of float member 40, ball valve 42, and connector 44 is disposed within conduit 30 and is thus free to move vertically therein in response to changes in the fuel level within conduit 30 and reservoir 10. Bleed valve 50 is disposed in the upper portion of the wall of reservoir 10 and is normally in the closed position so that reservoir 10 constitutes a closed system into which fuel enters through inlet port 12 and from which fuel exits through outlet port 22. The pressure equalization assembly in this instance is composed of bypass line 60 and valve 62 such as a stopcock or the like. Bypass line 60 extends from a lower portion of reservoir 10 (or its extension) to the downstream side of outlet port 22. Valve 62 is normally in the closed position so that the fuel exits from reservoir 10 only through port 22.

It will be seen that the fuel entering reservoir 10 through inlet port 12 passes through vents 34 and leaves via outlet port 22.

In the normal condition shown in FIG. 1 the rate of flow of fuel into reservoir 10 is in equilibrium with the rate of flow of fuel out of reservoir 10. This balanced flow of fuel maintains a substantially constant volume of fuel within reservoir 10, and as a consequence float member 40 keeps ball valve 42 far removed from valve seat 32.

When the flow of fuel into the reservoir during engine operation is discontinued (e.g., because the main fuel supply is exhausted) the fuel continues to be withdrawn from the reservoir until the level of the fuel and float member 40 fall far enough for ball valve 42 to form a fuel-tight seal with valve seat 32 and thereby seal off outlet port 22. The resulting cessation of fuel flow to the fuel injection system causes the engine to stop and while this takes place, a vacuum condition is created downstream from outlet port 22 which insures that a leak-proof seal is maintained between ball valve 42 and valve seat 32. FIG. 2 depicts this condition.

When replenishing the main fuel supply, fuel is introduced into reservoir 10 via inlet port 12. If the main fuel supply is positioned above reservoir 10, fuel introduced into the main fuel tank will of course flow into reservoir 10 by force of gravity. If on the other hand the main fuel tank and the reservoir are positioned such that a gravity feed to the reservoir is not possible, a separate pump, usually a manually actuated pump, will be used in order to restore the fuel in the reservoir. During the addition of the fuel to reservoir 10, bleed valve 50 is in the open position to allow the escape of air being displaced by the fuel being introduced into the reservoir. Concurrently, valve 62 is opened. The vacuum condition that exists downstream from the seal effected by ball valve 42 and valve seat 32 draws fuel from reservoir 10 through bypass line 60 and past valve 62 into spout 24 and into the line to which spout 24 is attached, i.e., the feed line to the fuel injection system. When a sufficient volume of fuel has been introduced to restore a normal volume of fuel in reservoir 10, bleed valve 50 is closed.

Valve 62 may be a two-way stopcock, a three-way stopcock, a plunger valve with spring reset, or like valving system. In situations in which it is desired to rigorously exclude even a small amount of air from entering into the the line below the situs of the former seal, it is desirable to use a three-way stopcock that enables bypass line 60 to be primed with fuel from reservoir 10 before opening the valve to spout 24. The operation of such a three-way stopcock is shown schematically in FIGS. 3A, 3B, and 3C, these Figures illustrating respectively the normal closed position which prevents flow of fuel through valve 62 to spout 24, the priming position which allows fuel to flow by force of gravity from reservoir 10 into bypass line 60 and the air being displaced from by-pass line 60 to escape from the system through valve 62, and the pressure equalization position which places fuel-filled bypass line 60 into open communication with spout 24. Thus when the system is equipped with a three-way stopcock, after turning valve 62 from the position of FIG. 3A to that of FIG. 3B, the valve is maintained in this position just long enough to insure that all the air has been displaced from bypass line 60 by fuel. Thereupon valve 62 is turned to the position of FIG. 3C whereby the pressure equalization on both sides of ball valve 42 occurs through the flow of fuel from reservoir 10 and open bypass line 60 into spout 24 to dissipate to preexisting vacuum condition.

Regardless of the specific form of valve 62 used in the assembly, as the pressure equalization occurs the pressure seal between ball valve 42 and valve seat 32 is relieved and thus the buoyancy of float member 40 causes the entire float valve means (in this case, float member 40, connector 44 and ball valve 42) to rise upwardly in conduit 30 to its normal position such as depicted in FIG. 1. If small amounts of air have entered the line below the situs of the former seal, these will bubble up from the line and thus be purged from the system when bleed valve 50 has been opened for replenishing the fuel in the reservoir and the upstream portions of the fuel system. Normal operation of the fuel-injected engine can resumed simply by returning valve 62 to its normal closed position and restarting the engine. It will be noted that the shut off system of this invention and the operations associated with its use prevented the intake of air into the fuel injection system, a condition which would have occurred but for its use.

It is of interest to observe that the size of the float valve means of the type depicted in FIGS. 1 and 2 (float member 40, connector 44 and ball valve 42) governs the volume of fuel that remains in reservoir 10 when the fuel shut off system is brought into operation by cessation of fuel flow into the system from the main fuel supply. Thus it is desirable to size these parts, for example the length of connector 44, so that there is a substantial quantity of fuel left in reservoir 10 after ball valve 42 has seated against and formed a seal with valve seat 32. Similarly, the volume of float member 40 should of course be large enough to insure that the float valve means has sufficient buoyancy to remain in its normal position such as depicted in FIG. 1 during normal operation, and to return to that position after the pressure equalization referred to above has taken place.

FIG. 4 depicts a variant that may be employed in the overall system depicted in FIGS. 1 and 2. In particular, FIG. 4 shows a preferred valve seat assembly that is used in place of bypass line 60 and valve 62 in the system of FIG. 1 for effecting the pressure equalization. In addition, FIG. 4 depicts use of a single ball valve 42 without a float member or connector. Except as described below, in all respects the operation of the overall system is as described above in reference to FIGS. 1 and 2.

The valve seat assembly of FIG. 4 comprises a conduit 70 having an upper threaded portion 71 for attachment to the end portion of conduit 30 that extends from the bottom of reservoir 10, and a threaded lower portion 72 to receive spout 24. Thus in effect conduit 70 is an extension of conduit 30 and its upper portion is a part of reservoir 10, and ball valve seat 32 is located in this extension of conduit 30 and below the remainder of reservoir 10. As depicted, valve seat 32 may be an O-ring seal although any suitably shaped valve seat may be used. Plunger 73 is threadably secured to conduit 70 by means of boss 75 and housing 79, and extends into inclined longitudinal passageway 74 disposed below and to the side of valve seat 32. Plunger 73 is adapted to slidably travel in passageway 74 and in FIG. 3 is depicted in its normal retracted position. Leakage of fuel through passageway 74 is prevented by seal 76 which provides a fuel-tight seal around plunger 73. The outer end of plunger 73 is fitted with knob 77 to facilitate use of the plunger. A cover 78 (e.g., a screw-on or snap-on hard cover or a flexible, e.g., rubber, cover that need not be removed) affords protection to the exposed portion of plunger 73 and knob 77.

As in the case of the previous discussion relative to the operation of the the system depicted in FIGS. 1 and 2, when the flow of fuel into reservoir 10 during engine operation is discontinued (e.g., because the main fuel supply is exhausted) the fuel continues to be withdrawn from the reservoir until the level of the fuel falls far enough for ball valve 42 to form a fuel-tight seal with valve seat 32 and thereby seal off outlet port 22. It will be noted that in the case of the system using the embodiment as depicted in FIG. 4, fuel outlet port is positioned in conduit 70—i.e., ball valve 42 descends from conduit 30 into conduit 70 where it makes a fuel-tight seal with valve seat 32, the position in which it is depicted in FIG. 3.

After this fuel-tight seal has been made and the engine has ceased to operate through fuel starvation, the main fuel supply is replenished, bleed valve 50 is opened and makeup fuel is introduced into reservoir 10. To effect the pressure equalization on the opposite sides of seal formed by ball valve 42 and valve seat 32, plunger 73 is pushed to its forward position by means of knob 77. In this connection, cover 78, if a removable hard cover, is of course removed to provide access to knob 77. But if cover 78 is made of a flexible material such as rubber, the pressure on knob 77 may be applied without removing the cover. In this case it is desirable to include a spring (not shown) around the exposed portion of plunger 73 and fitting against knob 77 that will push against the knob and thereby retract the plunger to its normal position after use. Because of the upwardly inclined orientation of plunger 73 and passageway 74, the forward tip of the plunger when the plunger is pushed to an inner or forward position engages and unseats ball valve 42. The vacuum condition existing downstream from the released ball valve is relieved by the flow of fuel past the unseated ball valve coming from conduit 70 and the remainder of reservoir 10. Here again because these flows are in effect sealed off from the atmosphere by the quantity of fuel in the reservoir, no adverse quantity of air is drawn into the injection system downstream from the ball valve. Any small amounts of air that may be drawn into the line below the situs of the former seal will be purged from the line when bleed valve 50 has been opened for replenishing the fuel in the reservoir and upstream portions of the fuel system.

After the float valve means (in this case ball valve 42) has returned to its normal position and bleed valve 50 has been closed, plunger 73 drawn back to its normal retracted position, and cover 78 replaced (if removed), normal engine operation can be resumed simply by restarting the engine.

FIGS. 5 and 6 illustrate some of the other float valve arrangements that may be used in the systems of this invention. In FIG. 5 the float valve is a single ball valve 42 preferably made of polypropylene or other fuel-resistant material of appropriate specific gravity relative to the fuel. As in the case of FIGS. 1 and 2, valve seat 32 in FIG. 5 is located in the base of reservoir 10. Ball valve 42 is shown in its sealing position in FIG. 5. As depicted, it is preferred that fuel inlet vents 34 in conduit 30 be in the form of vertical slots spaced equally around the conduit. It is also preferred that the height of these slots exceed the diameter of the ball valve 42, for example by one and one-half times to about twice the diameter of the ball valve.

FIG. 6 shows conjoint use of an extended reservoir 10 by virtue of the downward extension of conduit 30, and the use of a pair of superposed spheres within the conduit, the lower ball serving as ball valve 42. FIG. 6 shows this float valve system in its position after just making a seal with valve seat 32 under conditions involving a prior high rate of flow of fuel through inlet vents 34. Once the seal has been effected, the upper ball 85 will tend to float upwardly to the surface of the fuel remaining within the reservoir.

The reservoir may be disposed within or directly adjacent the main fuel supply tank(s) or it may be interposed at a convenient location in a fuel line leading to the fuel injection system. If desired it may be concentrically positioned within the fuel filter. In short, the system of this invention may be placed at any suitable location between the main fuel supply and the fuel injection system.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof. Thus it is not intended that this invention be limited by the description herein presented. Rather, what is intended to be covered as the subject matter set forth in the ensuing claims and the equivalents thereof to which the invention is entitled by law.

What is claimed is:

1. In a fuel-injected internal combustion engine comprising a fuel injection system fed by a main fuel supply, the improvement wherein there is interposed between the fuel supply and the injection system an automatic fuel shut off valve system which comprises:

(a) an air-tight reservoir having
  (1) a fuel inlet disposed at its upper portion and connectable to a fuel line leading from the fuel supply for the engine, and
  (2) a fuel outlet disposed at the bottom of the reservoir and connectable to a fuel line leading to a fuel injection system;

said reservoir, fuel inlet, and fuel outlet being adapted to maintain a balanced flow of fuel through the reservoir and to maintain a substantially constant volume of liquid fuel within the reservoir so long as fuel continues to enter the reservoir via the fuel inlet;

said reservoir together with said fuel inlet and said fuel outlet constituting the sole passageway by which the fuel line leading to the fuel injection system receives fuel from the fuel supply;

(b) a vertical conduit disposed within the reservoir and extending upwardly from the fuel outlet, the conduit having in its lower portion at least one fuel inlet vent providing communication from the interior of the reservoir outside the conduit to the fuel outlet;

(c) ball valve means including a ball valve and a ball valve seat for sealing off the flow of fuel from the reservoir when the volume of the fuel therein falls to a predetermined smaller quantity, said ball valve means being disposed within said conduit and said ball valve having a specific gravity less than but in proximity to the specific gravity of the fuel so that the ball valve remains afloat in the fuel except when brought into proximity to the ball valve seat as the volume of the fuel within the reservoir approaches said predetermined smaller quantity, and in which case the ball valve is drawn into the valve seat and seals off the flow of fuel into the fuel outlet;

(d) bleed valve means to provide, on actuation, open communication between the exterior of the reservoir and the interior of the upper portion of the reservoir; and (e) pressure equalization means to enable, on actuation, equalization of pressure on both sides of the situs of the seal created by the ball valve means, without intake of air into the fuel injection system.

2. In a fuel-injected internal combustion engine comprising a fuel injection system fed by a main fuel supply, the improvement wherein there is interposed between the fuel supply and the fuel injection system means that, when the main supply of fuel becomes exhausted, (i) automatically shuts off the flow of fuel to the fuel injection system, (ii) causes the engine to cease operating through fuel starvation, and (iii) prevents air from entering the fuel injection system.

3. In the operation of a fuel-injected internal combustion engine equipped with a fuel injection system and having a main fuel supply, the improvement which comprises automatically shutting off the flow of fuel to the fuel injection system when the main fuel supply becomes exhausted so that the engine ceases operating through fuel starvation before air enters the fuel injection system.

4. The method of claim 3 further characterized by:

(a) passing an air-free flow of fuel from the main fuel supply through an air-tight reservoir and thence through a fuel line to the injection system;

(b) when the main fuel supply reaches the condition at which it no longer flows to the reservoir, automatically sealing off the flow of fuel from the reservoir to the fuel injection system so that:

(i) a vacuum condition is created in the line between the reservoir and the fuel injection system, and the engine ceases to operate through fuel starvation; and (ii) a reserve supply of fuel is held within the reservoir thereby preventing entry of air into the fuel injection system;

(c) replenishing the main and reserve fuel supplies;

(d) equalizing the pressure between the reservoir and said line to relieve said vacuum condition existing in the line while preventing entry of air into the fuel injection system; and (e) restarting the engine thereby reestablishing an air-free flow of fuel from the replenished main fuel supply through the air-tight reservoir and thence through the fuel line to the injection system.

5. An automatic fuel shut off valve system for fuel-injected internal combustion engines which comprises:

(a) an air-tight reservoir having (1) a fuel inlet disposed at its upper portion and connectable to a fuel line leading from the fuel supply for the engine, and (2) a fuel outlet disposed at the bottom of the reservoir and connectable to a fuel line leading to a fuel injection system;

said reservoir, fuel inlet, and fuel outlet being adapted to maintain a balanced flow of fuel through the reservoir and to maintain a substantially constant volume of liquid fuel within the reservoir so long as fuel continues to enter the reservoir via the fuel inlet;

said reservoir together with said fuel inlet and said fuel outlet constituting the sole passageway by which the fuel line leading to the fuel injection system receives fuel from the fuel supply;

(b) a vertical conduit disposed within the reservoir and extending upwardly from the fuel outlet, the conduit having in its lower portion at least one fuel inlet vent providing communication from the interior of the reservoir outside the conduit to the fuel outlet;

(c) ball valve means including a ball valve and a ball valve seat for sealing off the flow of fuel from the reservoir when the volume of the fuel therein falls to a predetermined smaller quantity, said ball valve means being disposed within said conduit and said ball valve having a specific gravity less than but in proximity to the specific gravity of the fuel so that the ball valve remains afloat in the fuel except when brought into proximity to the ball valve seat as the volume of the fuel within the reservoir approaches said predetermined smaller quantity, and in which case the ball valve is drawn into the valve seat and seals off the flow of fuel into the fuel outlet;

(d) bleed valve means to provide, on actuation, open communication between the exterior of the reservoir and the interior of the upper portion of the reservoir; and (e) pressure equalization means to enable, on actuation, equalization of pressure on both sides of the situs of the seal created by the ball valve means, without intake of air into the fuel injection system.

6. Apparatus of claim 5 wherein of said ball valve consists of a single ball composed of polypropylene.

7. Apparatus of claim 5 wherein said ball valve means comprises in addition to the ball valve and ball valve seat (i) a float member disposed in the conduit above the ball, and (ii) a connector extending between the float member and the ball valve to enable them to move vertically in unison within said conduit in response to a change in the level of the fuel within the reservoir.

8. Apparatus of claim 5 wherein said ball valve means comprises in addition to the ball valve and ball valve seat at least one free floating spherical member in superposed relationship in the conduit above the ball valve, each such spherical member having a specific gravity less than but in proximity to the specific gravity of the fuel.

9. Apparatus of claim 5 further characterized in that said pressure equalization means comprises (i) a fuel bypass line adapted to transmit fuel remaining upstream from the seal effected by the ball valve means to a point downstream from the seal effected by the ball valve means, and (ii) a valve that on actuation opens said bypass line to enable said equalization of pressure.

10. Apparatus of claim 5 further characterized in that said pressure equalization means comprises means for displacing said ball valve after it has sealed off the flow of fuel from said reservoir to thereby enable said equalization of pressure.

11. Apparatus of claim 10 further characterized in that said means for displacing said ball valve comprises an elongate plunger extending outwardly from and slidably mounted in a fuel-tight manner within a longitudinal passageway disposed below and offset from the lower portion of the ball valve when the ball valve is seated in and is effecting a seal with the valve seat, the orientation of the plunger and passageway being such that upon forcing the outwardly extending portion of the plunger into the passageway the plunger unseats the ball valve.

12. Apparatus of claim 5 further characterized in that the valve seat is disposed in proximity to the fuel outlet.

13. Apparatus of claim 12 further characterized in that the vertical conduit extends below the remainder of the reservoir and the valve seat is disposed in such extension of the conduit and reservoir.

14. The combination of claim 1 wherein the engine is a fuel-injected gasoline engine.

15. The combination of claim 1 wherein the engine is a diesel engine.

* * * * *

UNITED STATES PATENT AND TRADEMARK OFFICE

CERTIFICATE OF CORRECTION

PATENT NO. : 4,715,345

DATED : DECEMBER 29, 1987

INVENTOR(S) : CARTER REAMES, JR.

It is certified that error appears in the above-identified patent and that said Letters Patent is hereby corrected as shown below:

Column 1, line 19, "looses" should read -- loses --;

Column 1, line 21, "restored" should read -- restored. --.

Column 4, line 12, "spout 24" should read -- spout 14 --.

Column 5, line 39, "to preexisting" should read -- the preexisting --;

Column 5, line 54, "can" should read -- can be --.

Column 6, line 32, "FIG. 3" should read "FIG. 4 --;

Column 6, line 42, "the the" should read -- the --;

Column 6, line 50, "fuel" should read -- the fuel --;

Column 6, lines 53-54, "FIG. 3." should read -- FIG. 4. --;

Column 6, line 59, "seal" should read -- the seal --.

Column 7, line 66, "as" should read -- is --.

Column 10, line 11, "of said" should read -- said --.

Signed and Sealed this

Thirteenth Day of September, 1988

*Attest:*

DONALD J. QUIGG

*Attesting Officer*

*Commissioner of Patents and Trademarks*